(12) United States Patent
Choi et al.

(10) Patent No.: US 8,451,223 B2
(45) Date of Patent: May 28, 2013

(54) POINTING APPARATUS, POINTER CONTROL APPARATUS, POINTING METHOD, AND POINTER CONTROL METHOD

(75) Inventors: Eun-seok Choi, Anyang-si (KR);
Won-chul Bang, Seongnam-si (KR);
Sang-on Choi, Suwon-si (KR);
Mun-cheol Choi, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1470 days.

(21) Appl. No.: 12/076,553

(22) Filed: Mar. 19, 2008

(65) Prior Publication Data

US 2009/0066646 A1    Mar. 12, 2009

(30) Foreign Application Priority Data

Sep. 6, 2007    (KR) .................. 10-2007-0090672

(51) Int. Cl.
*G08C 19/00*    (2006.01)
(52) U.S. Cl.
USPC ........... 345/158; 345/159; 345/163; 345/165; 345/157; 345/166; 345/179; 178/19.05; 348/734
(58) Field of Classification Search
USPC .............. 345/158, 156, 157, 159, 163, 179, 345/180, 182, 183; 178/19.05; 348/734
See application file for complete search history.

(56) References Cited

U.S. PATENT DOCUMENTS

| | | | | | |
|---|---|---|---|---|---|
| 3,504,334 | A | * | 3/1970 | Turnage, Jr. | 367/127 |
| 4,578,674 | A | * | 3/1986 | Baker et al. | 345/159 |
| 5,181,181 | A | * | 1/1993 | Glynn | 702/141 |
| 5,554,980 | A | * | 9/1996 | Hashimoto et al. | 345/158 |
| 6,118,441 | A | * | 9/2000 | Kobayashi et al. | 715/700 |
| 6,164,808 | A | * | 12/2000 | Shibata et al. | 700/85 |
| 6,184,863 | B1 | * | 2/2001 | Sibert et al. | 345/156 |
| 6,727,885 | B1 | * | 4/2004 | Ishino et al. | 345/156 |
| 7,714,843 | B1 | * | 5/2010 | Kong et al. | 345/166 |
| 7,796,116 | B2 | * | 9/2010 | Salsman et al. | 345/158 |
| 2004/0136083 | A1 | * | 7/2004 | Wang et al. | 359/642 |
| 2006/0125968 | A1 | * | 6/2006 | Yokozawa et al. | 348/734 |
| 2007/0211026 | A1 | * | 9/2007 | Ohta | 345/158 |
| 2007/0211239 | A1 | * | 9/2007 | Mandella et al. | 356/138 |

FOREIGN PATENT DOCUMENTS

| | | | |
|---|---|---|---|
| JP | 10-198506 | | 7/1998 |
| JP | 2001-236181 | * | 8/2001 |
| JP | 2004-050356 | | 2/2004 |
| KR | 10-2003-0009577 | | 2/2003 |
| KR | 10-2003-0072938 | | 9/2003 |
| KR | 10-2003-0086792 | | 11/2003 |

* cited by examiner

*Primary Examiner* — Lun-Yi Lao
*Assistant Examiner* — Olga Merkoulova
(74) *Attorney, Agent, or Firm* — Staas & Halsey LLP

(57) ABSTRACT

Provided is a pointing apparatus, a pointer control apparatus, a pointing method, and a pointer control method to a pointing apparatus, a pointer control apparatus, a pointing method, and a pointer control method capable of recognizing image codes included in an image frame using an image sensor to determine a pointing direction, and continuously updating the gain between the displacement of the motion of the pointing apparatus and the displacement of the motion of a displayed pointer. The pointing apparatus includes an image receiving unit sensing image patterns that exist in a sensed region, among all of the image patterns arranged in a display region; an inertial sensor sensing an input motion using at least one of the acceleration and angular velocity that are generated due to the motion; and a coordinate determining unit determining moving coordinates that are moved from the central coordinates of the sensed image pattern by coordinate displacement corresponding to the sensed motion.

25 Claims, 11 Drawing Sheets

POINTING APPARATUS, POINTER CONTROL APPARATUS, POINTING METHOD, AND POINTER CONTROL METHOD

CROSS REFERENCE TO RELATED APPLICATION

This application claims priority from Korean Patent Application No. 10-2007-0090672 filed on Sep. 6, 2007 in the Korean Intellectual Property Office, the disclosure of which is incorporated herein by reference in its entirety.

BACKGROUND OF THE INVENTION

1. Field of the Invention

The present invention relates to a pointing apparatus, a pointer control apparatus, a pointing method, and a pointer control method, and more particularly, to a pointing apparatus, a pointer control apparatus, a pointing method, and a pointer control method capable of recognizing image codes included in an image frame using an image sensor to determine a pointing direction, and continuously updating the gain between the displacement of the motion of the pointing apparatus and the displacement of the motion of a displayed pointer.

2. Description of the Related Art

Pointing apparatuses, which use inertial sensors (acceleration sensors or angular velocity sensors), sense an input motion using the inertial sensor and control the motion of a displayed pointer. When the inertial sensor is used to control the motion of a pointer, the motion of the pointer is determined according to the motion of the pointing apparatus regardless of the pointing direction of the pointing apparatus, which is called a relative pointing method.

In the relative pointing method, the user does not need to point a pointing apparatus at a display apparatus. However, the relative point method cannot be used in a case when the pointing apparatus is configured so as to operate only when the user points the pointing apparatus to the display apparatus.

Meanwhile, the gain relationship is established between the displacement of the motion of the pointing apparatus and the displacement of the motion of the pointer that is actually displayed on the display apparatus. In a pointing apparatus that senses a rotary motion using an inertial sensor, when the gain is fixed, the displacement of the motion of the pointer that is displayed on the display apparatus according to the displacement of a rotary motion of the pointing apparatus is fixed regardless of the distance between the pointing apparatus and the display apparatus, which makes it difficult to achieve an absolute pointing apparatus.

As described above, when only the inertial sensor is used, there is no way to provide an absolute pointing apparatus or update the gain. Therefore, a technique for solving these problems has been demanded.

SUMMARY OF THE INVENTION

Aspects of the present invention provide a technique for recognizing image codes included in an image frame using an image sensor to determine a pointing direction.

Aspects of the present invention also provide a technique for continuously updating the gain between the displacement of the motion of a pointing apparatus and the displacement of the motion of a displayed pointer.

However, aspects of the present invention are not restricted to the one set forth herein. The above and other aspects of the present invention will become more apparent to one of daily skill in the art to which the present invention pertains by referencing a detailed description of the present invention given below.

According to an aspect of the present invention, there is provided an pointing apparatus including: an image receiving unit sensing image patterns that exist in a sensed region, among all of the image patterns arranged in a display region; an inertial sensor sensing an input motion using at least one of the acceleration and angular velocity that are generated due to the motion; and a coordinate determining unit determining moving coordinates that are moved from the central coordinates of the sensed image pattern by coordinate displacement corresponding to the sensed motion.

According to another aspect of the present invention, there is provided a pointer control apparatus including: a receiving unit receiving image patterns that exist in a sensed region among all of the image patterns arranged in a display region and a motion that is sensed by an inertial sensor; and a coordinate determining unit determining moving coordinates that are moved from the central coordinates of the image pattern by coordinate displacement corresponding to the sensed motion.

According to another aspect of the present invention, there is provided a pointing method including: sensing image patterns that exist in a sensed region, among all of the image patterns arranged in a display region; sensing an input motion using at least one of the acceleration and angular velocity that are generated due to the motion; and determining moving coordinates that are moved from the central coordinates of the sensed image pattern by coordinate displacement corresponding to the sensed motion.

According to another aspect of the present invention, there is provided a pointer control method including: receiving image patterns that exist in a sensed region among all of the image patterns arranged in a display region and a motion that is sensed by an inertial sensor; and determining moving coordinates that are moved from the central coordinates of the image pattern by coordinate displacement corresponding to the sensed motion.

BRIEF DESCRIPTION OF THE DRAWINGS

The above and other features and advantages of the present invention will become more apparent by describing in detail preferred embodiments thereof with reference to the attached drawings in which.

DESCRIPTION OF THE PREFERRED EMBODIMENTS

Figure 1:
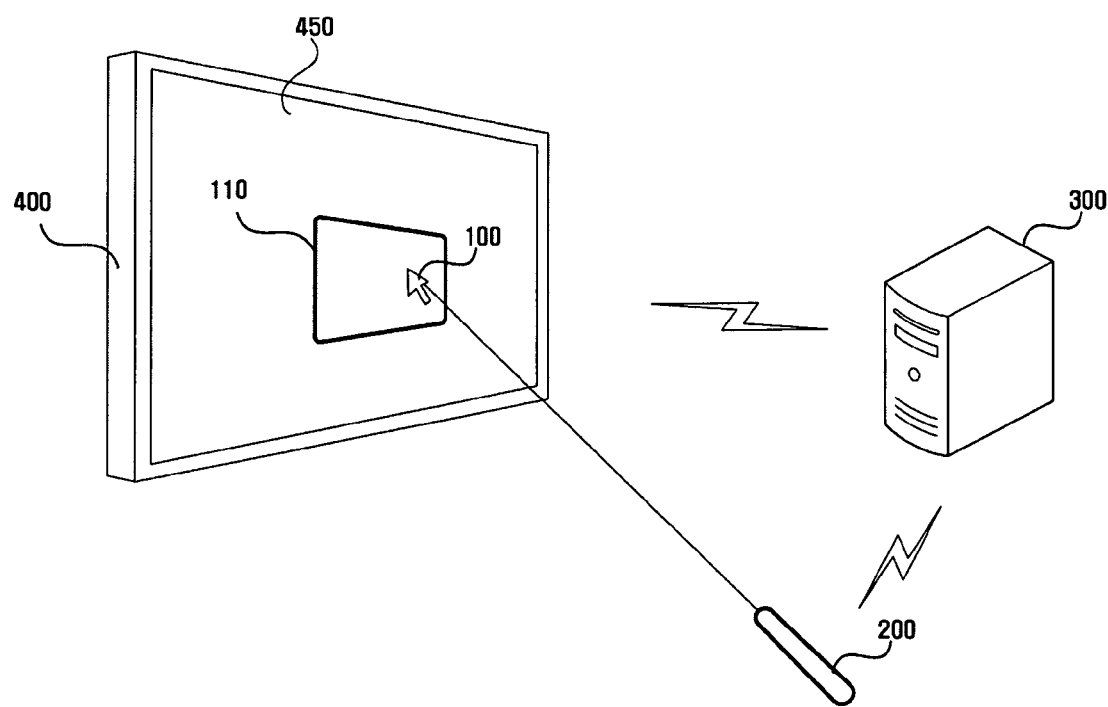
FIG. 1 is a diagram illustrating a pointer control system according to an embodiment of the invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Like reference numerals in the drawings denote like elements, and thus their description will be omitted.

FIG. 1 is a diagram illustrating a pointer control system according to an embodiment of the invention. The pointer control system includes a pointing apparatus 200, a pointer control apparatus 300, and a display apparatus 400.

The pointer control apparatus 300 generates a mouse pointer 100, a graphic object 110, and an image pattern for allowing the pointing apparatus 200 to determine the range of an image recognizing region 700. The image recognizing region means an image region that is sensed by an image receiving unit provided in the pointing apparatus 200. The pointing apparatus 200 determines the range of the image recognizing region to know a pointing position on a current display region 450.

The pointer control apparatus 300 may be an apparatus having a data processing function and an operating function, such as a personal computer provided with a central processing unit, a TV set-top box, or a CPU board provided in a TV.

The user can use the pointing apparatus 200 to point to a predetermined position on the display region 450. The pointing apparatus 200 can recognize a pointing position using an image pattern displayed on the display region 450.

The pointing apparatus 200 can analyze the displayed image pattern to determine the range of an image pattern, and extract the coordinates of a pointing position on the recognized display region 450 on the basis of the range of the image pattern.

Data transmission between the pointer control apparatus 300 and the pointing apparatus 200 is performed by wire or wireless communication. The pointing apparatus 200 transmits the coordinates of the extracted pointing position to the pointer control apparatus 300. Then, the pointer control apparatus 300 converts the received coordinates into the actual coordinates on the display region 450.

The images of the image pattern, the graphic object 110 and the mouse pointer 100 generated by the pointer control apparatus 300 are transmitted to the display apparatus 400, and then the display apparatus 400 displays the received images.

The pointer control apparatus 300 and the display apparatus 400 may be integrated into one apparatus.

Figure 2:
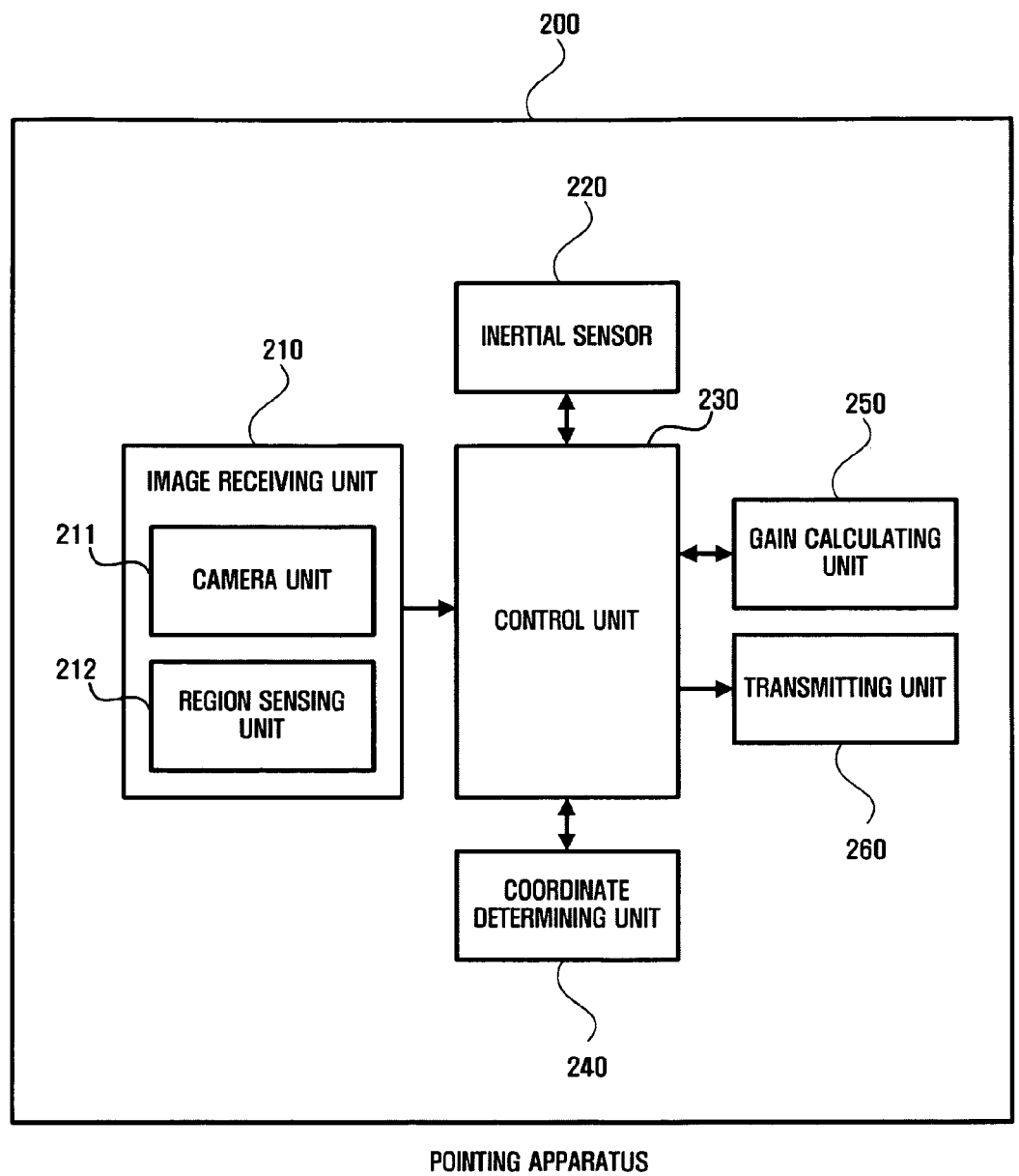
FIG. 2 is a block diagram illustrating the structure of a pointing apparatus according to an embodiment of the invention.

FIG. 2 is a block diagram illustrating the structure of the pointing apparatus according to the embodiment of the invention. The pointing apparatus 200 includes an image receiving unit 210, an inertial sensor 220, a control unit 230, a coordinate determining unit 240, a gain calculating unit 250, and a transmitting unit 260.

The image receiving unit 210 senses an image pattern that is displayed on a recognized region, among all of the image patterns displayed on the display region 450. The display apparatus 400 displays a continuous series of image frames to form a still picture or a moving picture. All of the image patterns may be arranged in image frames that are displayed at a predetermined time interval, among the image frames displayed on the display region 450.

For example, when the display apparatus 400 displays thirty image frames per second, all of the image patterns may be arranged in at least one of the thirty image frames, and the image frames having the image patterns arranged therein may be displayed at a predetermined time interval. In order to sense the image pattern, the image receiving unit 210 may include a camera unit 211 and a region sensing unit 212.

The camera unit 211 captures image patterns included in a specific image frame among the image frames displayed on the display region 450. The image pattern may be formed by visible rays, infrared rays, or ultraviolet rays. When an image pattern is formed by visible rays, the camera unit 211 may perform the function of a general digital camera to capture the image pattern.

Meanwhile, when an image pattern is formed by infrared rays or ultraviolet rays, the camera unit 211 may perform the function of an infrared camera or an ultraviolet camera to capture the image pattern.

The region sensing unit 212 senses the range of an image pattern. For example, when a plurality of image codes forming an image pattern are arranged on the display region 450, the region sensing unit 212 uses the arrangement of partial images to sense the range of the image pattern.

In order to sense the range of an image pattern, a plurality of different image codes forming an image pattern may be arranged at fixed positions on the display region 450.

After sensing the range of the image pattern, the region sensing unit 212 may check the central coordinates of the image pattern.

The inertial sensor 220 displays the inertial force of a mass that is generated by acceleration or angular velocity as the deformation of an elastic structure connected to the mass, and displays the deformation of the structure as electric signals using an appropriate sensing method and an appropriate signal processing method. In this embodiment, the inertial sensor 220 senses the motion of the pointing apparatus 200.

That is, the inertial sensor 220 uses at least one of the acceleration and the angular velocity that are generated by the actual motion input to the pointing apparatus 200 to sense the estimated motion of the pointing apparatus on the basis of the actual motion.

The inertial sensor 220 may sense a three-dimensional motion composed of a linear motion and a curvilinear motion, as well as a two-dimensional motion, such as a linear or curvilinear motion. That is, the inertial sensor 220 generates a series of electric signals from a two-dimensional or three-dimensional basic motion. The user may combine a plurality of basic motions to generate a desired motion.

The coordinate determining unit 240 determines moving coordinates that are moved from the central coordinates of an image pattern by coordinate values corresponding to the motion sensed by the inertial sensor 220. The central coordinates of the image pattern sensed by the region sensing unit 212 may be the absolute coordinates of the image pattern on the display region 450. The coordinate determining unit 240 determines the absolute coordinates of an image pattern that are moved from the central coordinates by coordinate values input from the inertial sensor 220.

Meanwhile, in the pointing apparatus 200 provided with the inertial sensor 220, the motion sensed by the inertial sensor 220 is the motion input by the user. When the same gain is applied, the coordinates on the display region 450 are moved in proportional to the rotation angle of the pointing apparatus 200, regardless of the distance between the display apparatus 400 and the pointing apparatus 200.

However, in order to operate the pointing apparatus 200 provided with the inertial sensor 220 like an absolute-pointing-type pointing apparatus, the coordinates need to be moved on the display region 450 in consideration of the rotation angle of the pointing apparatus 200 and the distance between the display apparatus 400 and the pointing apparatus 200.

For example, when the distance between the display apparatus 400 and the pointing apparatus 200 is small, the user needs to make a large motion in order to form specific coordinate displacement on the display region 450. However, when the distance between the display apparatus 400 and the pointing apparatus 200 is large, the user does not need to make a large motion.

Therefore, it is preferable to apply the gain depending on the distance between the display apparatus 400 and the pointing apparatus 200 to the motion sensed by the inertial sensor 220, in order to determine coordinate displacement on the display region 450. The gain calculating unit 250 compares the coordinate displacement between two image patterns that are sensed at a predetermined time interval among the image patterns with inertial coordinates displacement corresponding to the motion sensed by the inertial sensor 220 for a predetermined period, and calculates the gain for synchronizing the inertial coordinates displacement with the displacement of the moving coordinates on the display region 450.

As described above, when the image frames each having image patterns arranged therein are displayed at a predetermined time interval, the image receiving unit 210 receives the image patterns at the predetermined time interval. When the user inputs a motion, the difference between two image patterns in the time direction occurs, and the coordinate determining unit 240 can calculate coordinate displacement due to the difference between the image patterns.

The coordinates determining unit 240 can calculate coordinate displacement due to the motion sensed by the inertial sensor 220. The gain calculating unit 250 calculates gain for synchronizing two coordinate displacements. The operation of the gain calculating unit 250 calculating the gain will be described in detail below with reference to FIG. 9.

The coordinate determining unit 240 determines moving coordinates that are moved from the central coordinates of the image pattern sensed after a predetermined time by the inertial coordinate displacement to which the gain is applied.

The transmitting unit 260 transmits the central coordinates of the image pattern sensed by the image receiving unit 210 and the moving coordinates determined by the coordinate determining unit 240 to the pointer control apparatus 300. In this case, the gain is applied to the moving coordinates.

Data communication may be performed between the transmitting unit 260 and the pointer control apparatus 300 by wire communication methods, such as Ethernet, USB, IEEE 1394, serial communication, and parallel communication, or wireless communication methods, such as infrared communication, Bluetooth, Home RF, and wireless LAN.

Meanwhile, when the pointer control apparatus 300 is provided with the coordinate determining unit and the gain calculating unit, only the image pattern captured by the camera unit 211 and the motion sensed by the inertial sensor 220 may be transmitted to the pointer control apparatus 300 through the transmitting unit 260.

The control unit 230 controls the image receiving unit 210, the inertial sensor 220, the coordinate determining unit 240, the gain calculating unit 250, the transmitting unit 260, and the pointing apparatus 200.

Figure 3:
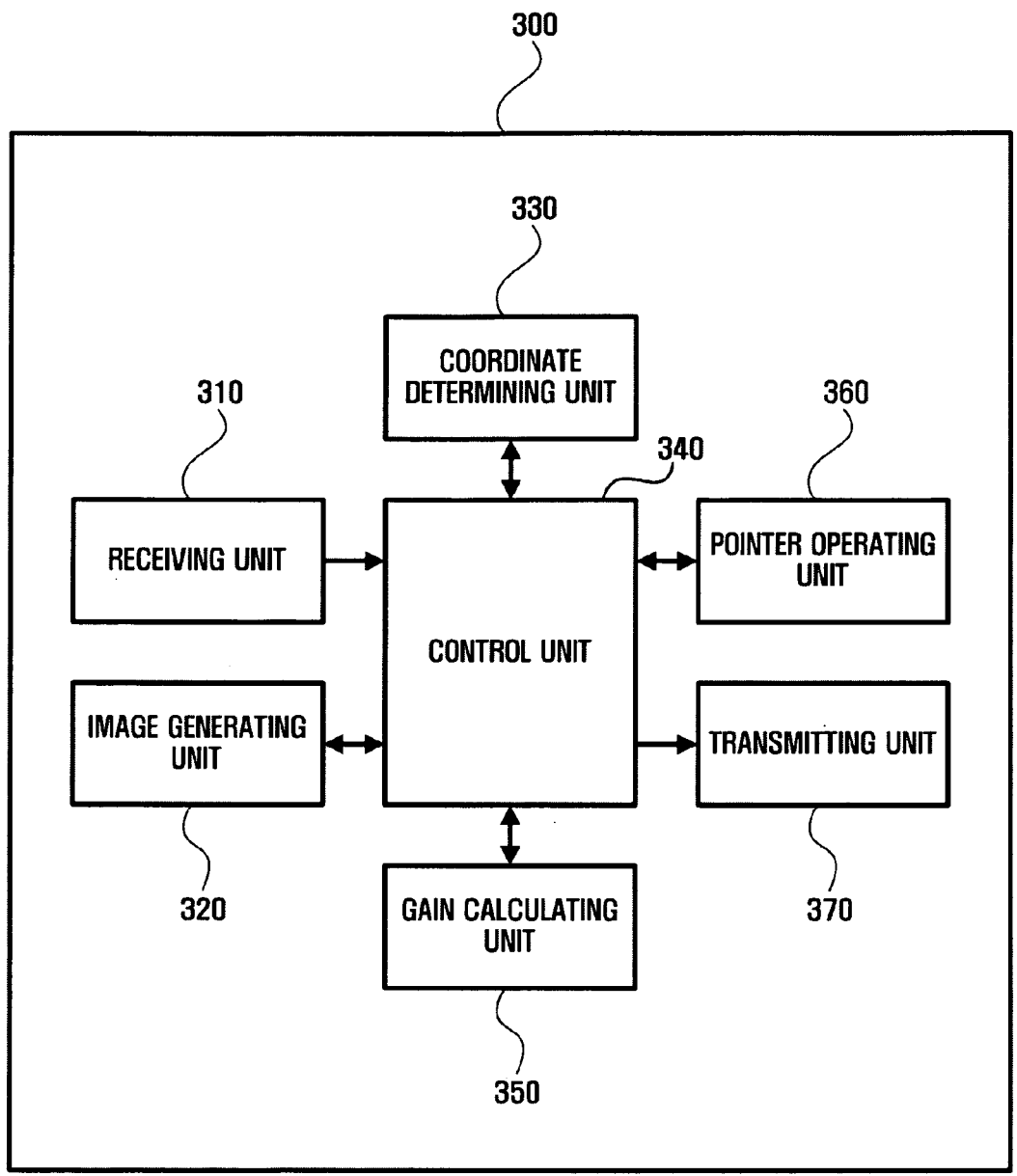
FIG. 3 is a block diagram illustrating the structure of a pointer control apparatus according to an embodiment of the invention.

FIG. 3 is a block diagram illustrating the structure of the pointer control apparatus according to the embodiment of the invention. The pointer control apparatus 300 includes a receiving unit 310, an image generating unit 320, a coordinate determining unit 330, a control unit 340, a gain calculating unit 350, a pointer operating unit 360, and a transmitting unit 370.

The image generating unit 320 generates image frames. The image generating unit 320 can generate thirty or sixty image frames per second, and image patterns may be arranged in one or more image frames. The image frames generated by the image generating unit 320 are transmitted to the display apparatus 400 through the transmitting unit 370, and the display apparatus 400 displays the received image frames.

The receiving unit 310 receives the central coordinates of an image pattern and the moving coordinates from the pointing apparatus 200. The moving coordinates are the coordinates of a position that is moved from the central coordinates of an image pattern in the image region sensed by the image receiving unit 210 of the pointing apparatus 200 by the coordinate displacement sensed by the inertial sensor 220, and include the absolute coordinates of the image pattern on the display region 450.

The received coordinates are transmitted to the pointer operating unit 360, and the pointer operating unit 360 moves the mouse pointer 100 to the received coordinates.

The transmitting unit 370 transmits the image of the mouse pointer 100 whose position is moved to the display apparatus 400. Then, the display apparatus 400 displays the mouse pointer 100 on the display region 450.

Meanwhile, when the pointer control apparatus 300 is provided with the coordinate determining unit 330 and the gain calculating unit 350, the receiving unit 310 can receive the motion sensed by the inertial sensor 220 and the image patterns that exist in a predetermined image region sensed by the image receiving unit 210 of the pointing apparatus 200, among all of the image patterns arranged in the display region 450.

The coordinate determining unit 330 checks the central coordinates of the image pattern, and determines the moving coordinates that are moved from the central coordinates by coordinate displacement that corresponds to the motion sensed by the inertial sensor 220.

Then, the gain calculating unit 350 calculates gain for synchronizing inertial coordinate displacement corresponding to the motion sensed by the inertial sensor 220 with the moving coordinate displacement on the display region 450.

The coordinate determining unit 330 and the gain calculating unit 350 of the pointer control apparatus 300 have the same functions as the coordinate determining unit 240 and the gain calculating unit 250 of the pointing apparatus 200, and thus a detailed description thereof will be omitted.

The pointer operating unit 360 moves the mouse pointer 100 according to the results obtained from the coordinate determining unit 330 and the gain calculating unit 350, and the transmitting unit 370 transmits the image of the moved mouse pointer 100 to the display apparatus 400.

The control unit 340 controls the receiving unit 310, the image generating unit 320, the coordinate determining unit 330, the gain calculating unit 350, the pointer operating unit 360, the transmitting unit 370, and the pointer control apparatus 300.

Meanwhile, the pointer control apparatus 300 may be provided with a display device (not shown). In this case, the display device may display the mouse pointer 100 moved by the pointer operating unit 360.

Figure 4:
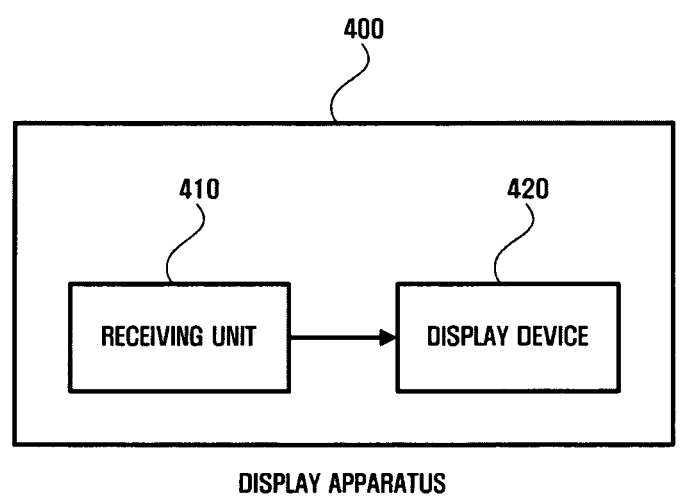
FIG. 4 is a block diagram illustrating the structure of a display apparatus according to an embodiment of the invention.

FIG. 4 is a diagram illustrating the structure of the display apparatus according to the embodiment of the invention. The display apparatus 400 includes a receiving unit 410 and a display device 420.

The receiving unit 410 receives image frames from the pointer control apparatus 300, and the display device 420 displays the received image frames.

The display device 420 is a module having an image display unit capable of displaying input image signals, such as a CRT (cathode ray tube), an LCD (liquid crystal display), an LED (light-emitting diode), an OLED (organic light-emitting diode), or a PDP (plasma display panel), and displays received image information.

In FIGS. 2 and 3, the pointer control apparatus 300 and the display apparatus 400 are separated from each other, but the invention is not limited thereto. The pointer control apparatus 300 and the display apparatus 400 may be integrated into one apparatus.

Figure 5:
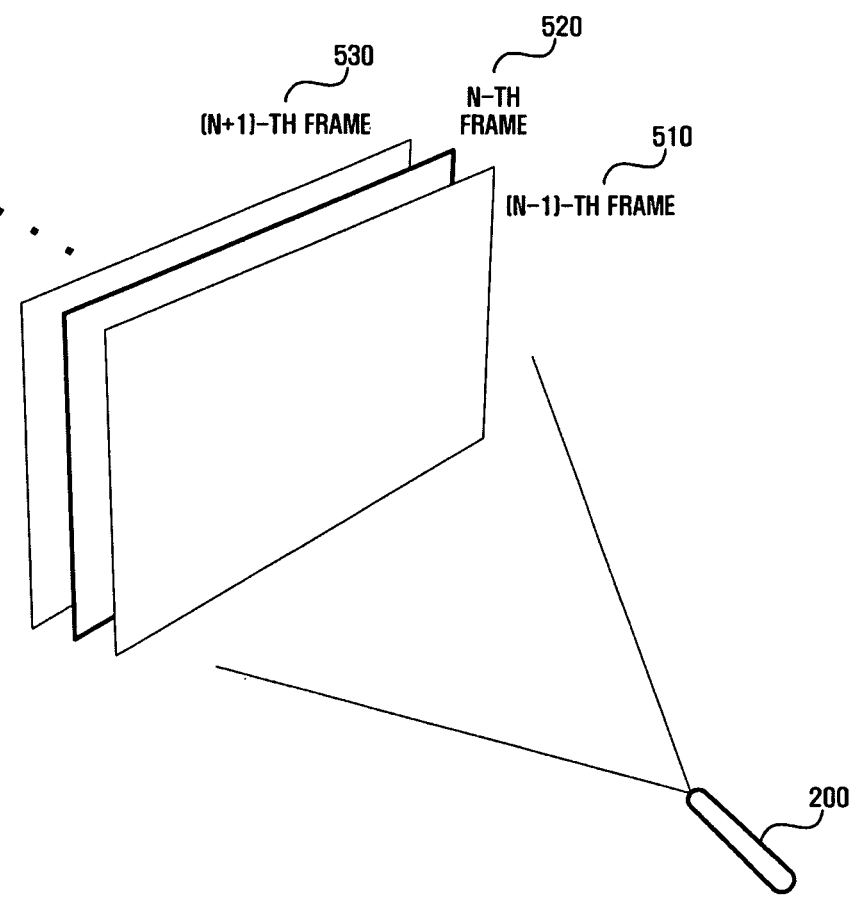
FIG. 5 is a diagram illustrating image frames each having image patterns arranged therein according to an embodiment of the invention.

FIG. 5 is a diagram illustrating image frames each having image patterns arranged therein according to the embodiment of the invention.

The image frames generated by the image generating unit 320 are displayed by the display device 420 of the display apparatus 400. In this case, the display device 420 may display thirty or sixty different image frames 510, 520, and 530 per second.

In this embodiment, the image frame 520 having image patterns arranged at predetermined time intervals may be displayed. That is, the image frame 520 having the image patterns arranged therein may be interposed between the image frames 510 and 530 each including only general image information.

As described above, the image patterns are formed by visible rays, infrared rays, or ultraviolet rays. When the image patterns are formed by visible rays, it is preferable that the image frame 520 include only the image patterns. When the image patterns are formed by infrared rays or ultraviolet rays, the image patterns may be included in the image frame 510 or 530 including general image information.

When the display device displays thirty or sixty image frames per second, preferably, the camera unit 211 provided in the pointing apparatus 200 recognizes one frame in a 1/30 or 1/60 second.

Figure 6:
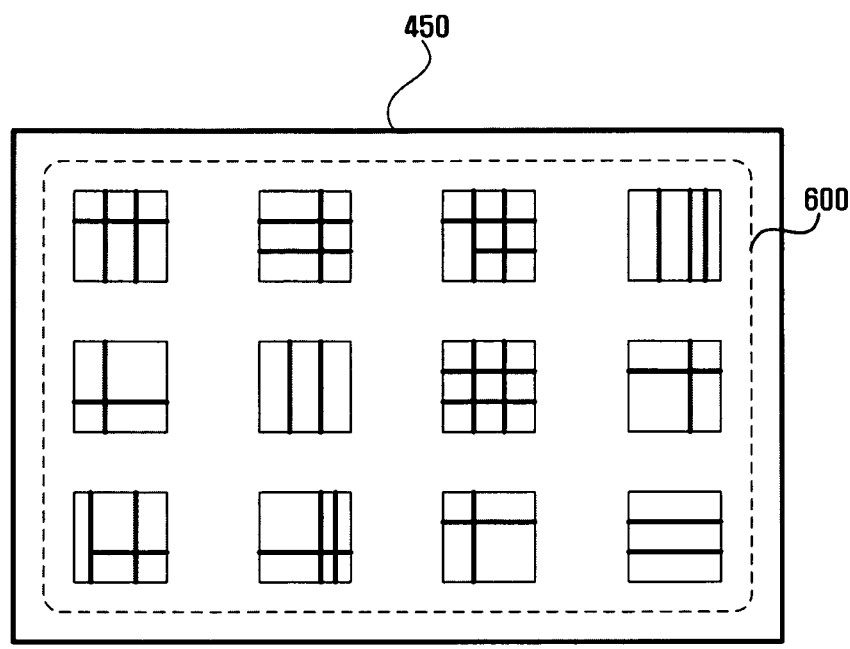
FIG. 6 is a diagram illustrating image patterns each composed of image codes according to an embodiment of the invention.

FIG. 6 is a diagram illustrating an image pattern composed of image codes according to an embodiment of the invention. FIG. 6 shows an image frame including an image pattern 600 among the image frames displayed by the display device 420.

As shown in FIG. 6, the image pattern 600 includes a plurality of different image codes, and the image codes are arranged at fixed positions on the display region 450. Therefore, the region sensing unit 212 of the pointing apparatus 200 can check a position indicated by the pointing apparatus 200 on the basis of the image captured by the camera unit 211.

Figure 7:
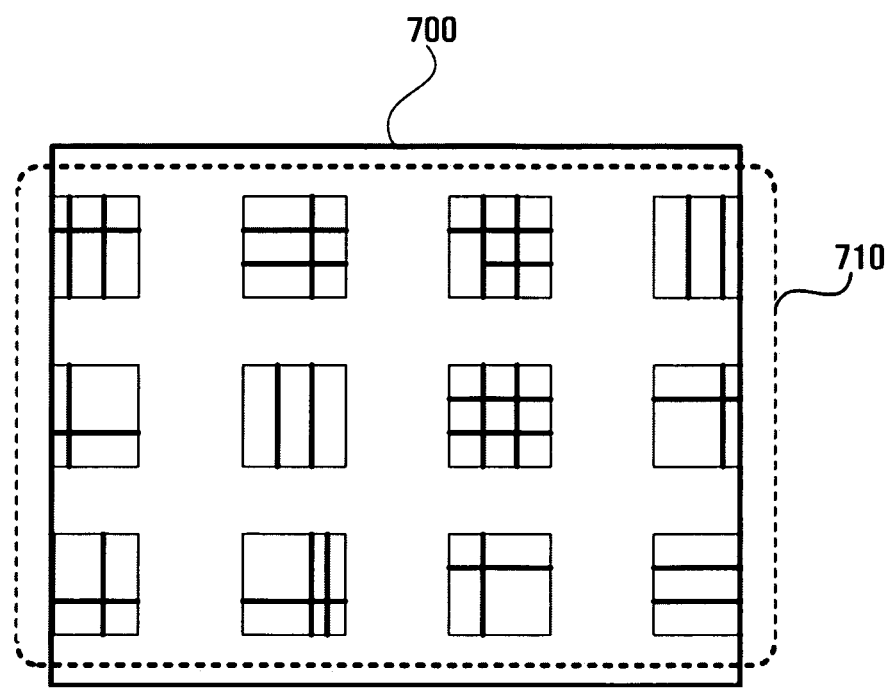
FIGS. 7 and 8 are diagrams illustrating image patterns recognized by an image receiving unit according to an embodiment of the invention.
Figure 8:
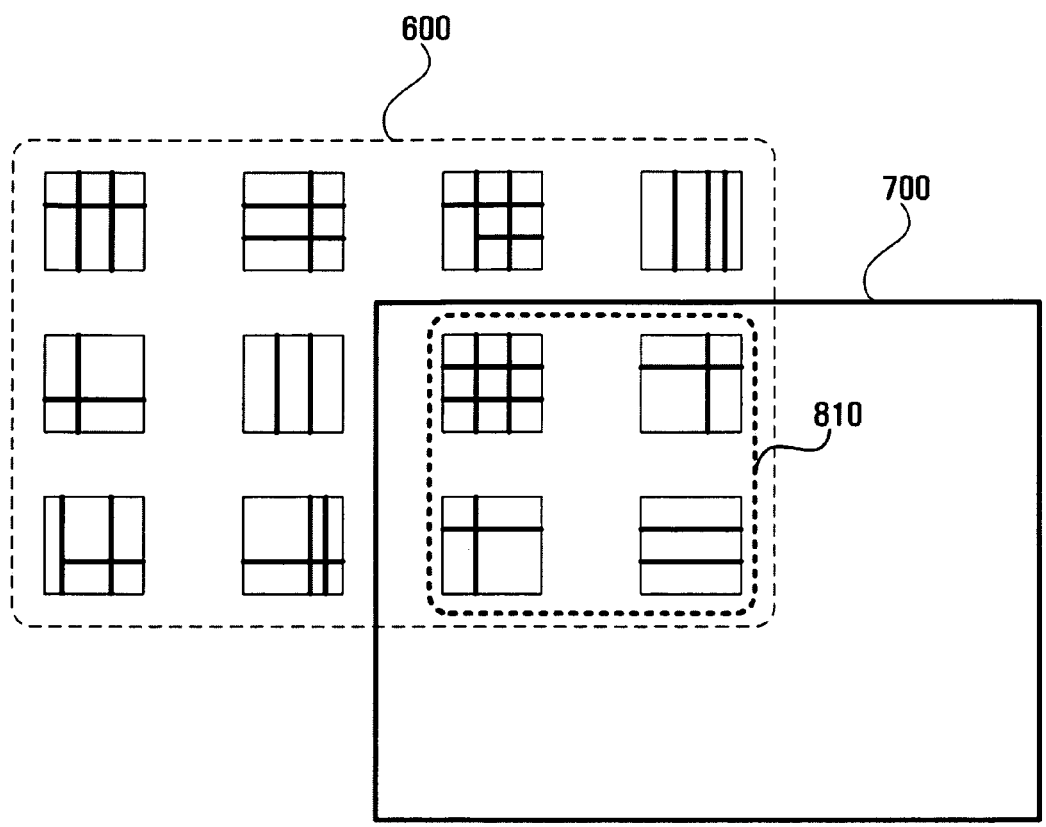

FIGS. 7 and 8 are diagrams illustrating image patterns 710 sensed by the image receiving unit 210 according to the embodiment of the invention. FIGS. 7 and 8 show the image patterns 710 arranged in an image region (hereinafter, referred to a recognition region) 700 recognized by the camera unit 211.

FIG. 7 shows some image patterns 700 arranged in the recognition region 700, among all of the image patterns 600. In FIG. 7, right and left portions of the image patterns are cut. Therefore, the region sensing unit 212 compares the image patterns 710 in the recognition region 700 with the image patterns on the display region 450 that are stored beforehand to know that the pointing apparatus 200 points to the center of the display region 450.

The pointing apparatus 200 may be provided with a storage unit (not shown) that stores the image patterns on the display region 450.

Meanwhile, some image patterns 810 that are positioned at a lower left portion among the image patterns 600 may be arranged in the recognition region 700, as show in FIG. 8. The region sensing unit 212 can know that the pointing apparatus 200 points to a lower right portion of the display region 450 using the image patterns 810 arranged at an upper left portion of the recognition region 700.

The region sensing unit 212 compares the image patterns arranged in the recognition region 700 (hereinafter, referred to as a recognition image pattern) with the image patterns on the display region 450 that are stored beforehand (hereinafter, referred to as display image patterns) to calculate the coordinates of the image pattern on the display region 450. The scales of the recognition image patterns and the display image patterns may depend on the distance between the display apparatus 400 and the pointing apparatus 200.

That is, when the distance between the display apparatus 400 and the pointing apparatus 200 is small, the size of the recognition image pattern may be larger than that of the display image pattern. When the distance between the display apparatus 400 and the pointing apparatus 200 is large, the size of the recognition image pattern may be smaller than that of the display image pattern.

Therefore, the region sensing unit 212 performs image processing on the recognition region 700 to make the scale of the recognition image pattern equal to the scale of the display image pattern, and checks the coordinates of a position indicated by the pointing apparatus 200.

Further, the recognition image pattern may be recognized as being distorted according to the pointing angle of the pointing apparatus 200 with respect to the display apparatus 400. In this case, the region sensing unit 212 corrects the distorted image pattern in the forward direction, and compares the corrected image pattern with the display image pattern, thereby checking the coordinates of a position indicated by the pointing apparatus 200.

Figure 9:
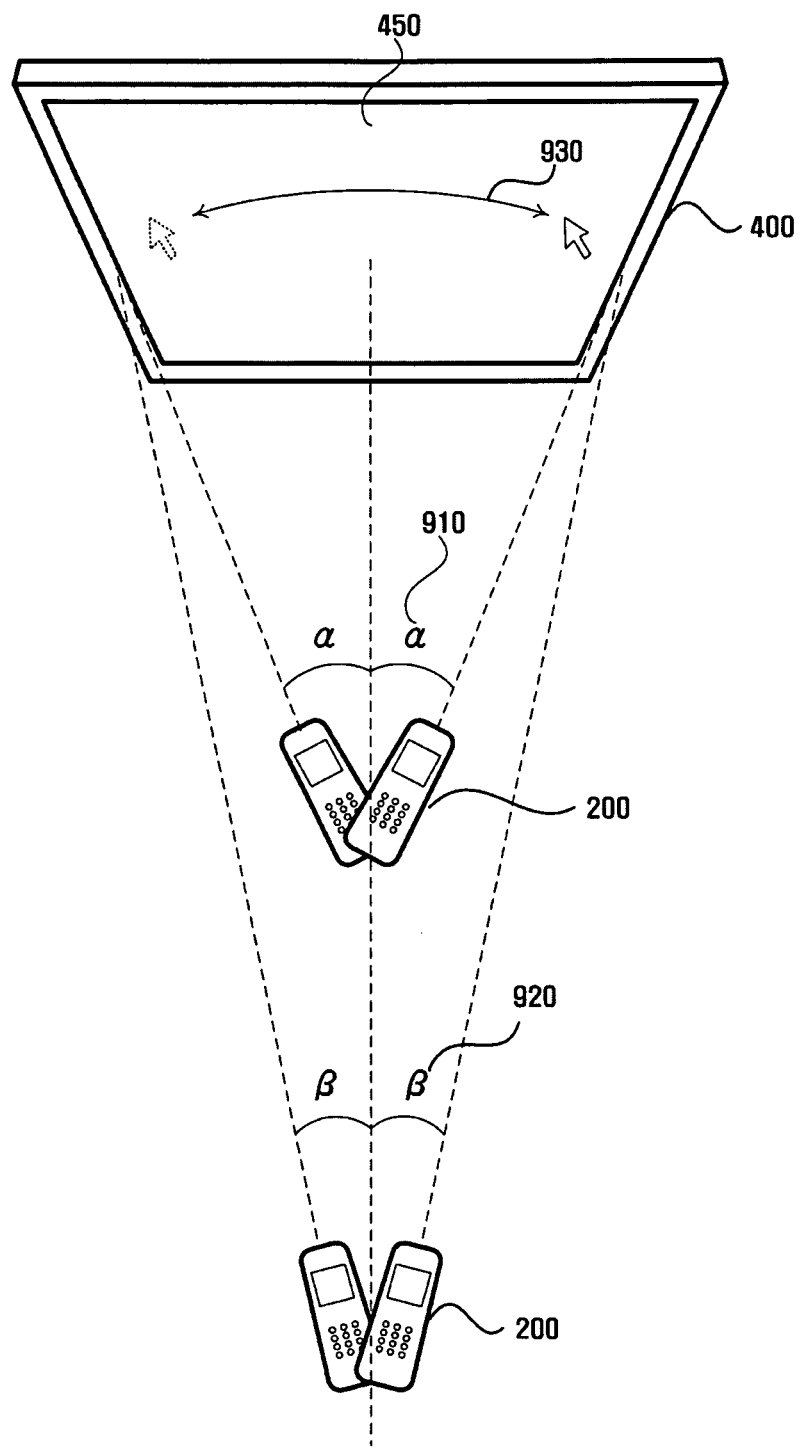
FIG. 9 is a diagram illustrating the relationship between the displacement of the motion of the pointing apparatus and the displacement of the motion of a pointer according to an embodiment of the invention.

FIG. 9 is a diagram illustrating the relationship between the displacement of the pointing apparatus and the displacement of the pointer according to the embodiment of the invention.

The user may input a motion into the pointing apparatus 200 such that the mouse pointer 100 moves between a left end and a right end of the display region 450. In this case, the mouse pointer 100 moves to correspond to the motion sensed by the inertial sensor 220 of the pointing apparatus 200, and the amount 930 of the motion of the pointing apparatus 200 is regardless of the distance between the display apparatus 400 and the pointing apparatus 200.

However, in order to achieve an absolute pointing apparatus, it is preferable that the amount 930 of the motion of the mouse pointer 100 be kept constant even when the amount 910 or 920 of the motion of the pointing apparatus 200 varies according to the distance between the display apparatus 400 and the pointing apparatus 200, as shown in FIG. 9.

In order to keep the amount of the motion of the mouse pointer 930 constant, the gain calculating unit 250 continuously updates the gain, and the coordinate determining unit 240 applies the updated gain to the motion sensed by the inertial sensor 220. The gain is calculated as follows.

In this embodiment, since the mouse pointer 100 is two-dimensionally moved on the display region 450, only the two-dimensional motion among the motions input to the pointing apparatus 200 will be considered. It is assumed that the horizontal direction of the display apparatus 400 is an X-axis, and the vertical direction thereof is a Y-axis. It is considered only the angular velocity sensed by the inertial sensor 220 in this embodiment.

The image patterns are displayed at predetermined time intervals. When the angular velocity sensed by the inertial sensor 220 between adjacent times $t_1$ and $t_2$ is $(\theta_x, \theta_y)$, an angular variation is represented by Expression 1 given below:

$$\theta_x = \int_{t1}^{t2} \theta_x dx, \text{ and}$$

$$\theta_y = \int_{t1}^{t2} \theta_y dy. \quad \text{[Expression 1]}$$

When the central coordinates of an image pattern are $(x_1, y_1)$, the central coordinates of the next image pattern are $(x_2, y_2)$, and gain is $(R_x, R_y)$, the relationship therebetween is represented by Expression 2 given below:

$$R_x \theta_x = x_2 - x_1, \text{ and}$$

$$R_y \theta_y = y_2 - y_1. \quad \text{[Expression 2]}$$

The gain $(R_x, R_y)$ is rearranged as Expression 3 given below:

$$R_x = \frac{x_2 - x_1}{\theta_x}, \text{ and}$$

$$R_y = \frac{y_2 - y_1}{\theta_y}. \quad \text{[Expression 3]}$$

When the angular velocity sensed by the inertial sensor 220 after a predetermined time is $(\theta_x, \theta_y)$, coordinate displacement $(\Delta x, \Delta y)$ is represented by Expression 4 given below:

$$\Delta x = R_x \theta_x, \text{ and}$$

$$\Delta y = R_y \theta_y. \quad \text{[Expression 4]}$$

Figure 10:
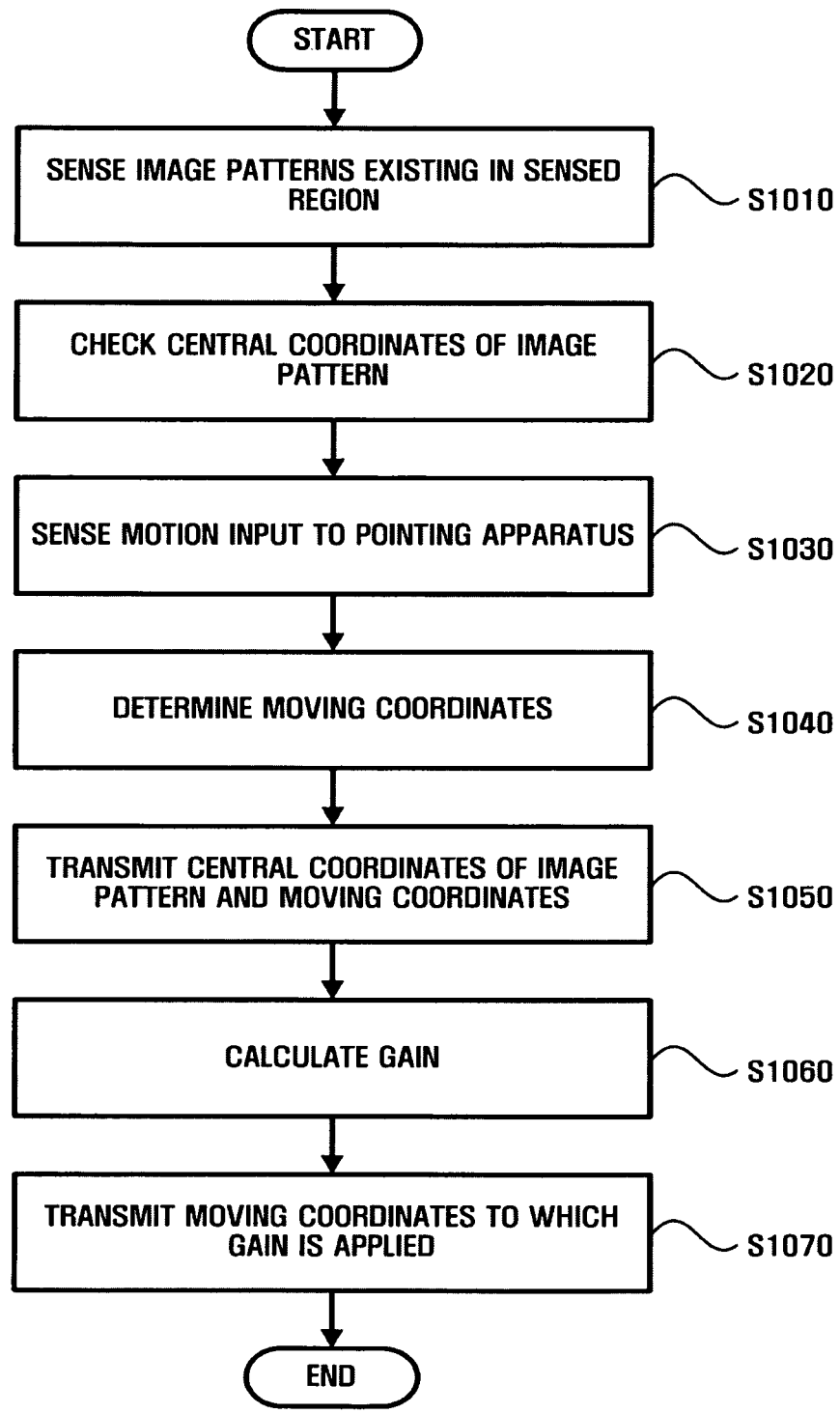
FIG. 10 is a flowchart illustrating a pointing process according to an embodiment of the invention.

FIG. 10 is a flowchart illustrating a pointing process according to an embodiment of the invention. In order to control the motion of the mouse pointer 100, first, the image receiving unit 210 of the pointing apparatus 200 senses image patterns existing in a sensed region, among all of the image patterns arranged in the display region 450 (S1010).

Then, the region sensing unit 212 of the image receiving unit 210 senses the range of image patterns and checks the central coordinates of the image pattern (S1020). The central coordinates include absolute coordinates on the display region 450.

The inertial sensor 220 uses at least one of the acceleration and the angular velocity generated due to a motion input to the pointing apparatus 200 to sense an estimated motion for the input motion (S1030).

Then, the coordinate determining unit 240 determines moving coordinates that are moved from the central coordinates of the image pattern by coordinate displacement corresponding to the motion sensed by the inertial sensor 220 (S1040).

The central coordinates of the image pattern checked by the image receiving unit 210 and the moving coordinates determined by the coordinate determining unit 240 are transmitted to the pointing control apparatus through the transmitting unit 260 (S1050).

Meanwhile, the image receiving unit 210 receives image frames each having image patterns arranged therein at predetermined time intervals. The gain calculating unit 250 compares the displacement between the coordinates of two image patterns with inertial coordinate displacement for the motion sensed by inertial sensor 220 to calculate the gain for synchronizing the inertial coordinate displacement with the displacement of the moving coordinates on the display region 450 (S1060).

Then, the coordinate determining unit 240 determines moving coordinates that are moved from the central coordinates of an image pattern sensed after a predetermined time by inertial coordinate displacement to which gain is applied, and the determined moving coordinates are transmitted to the pointer control apparatus 300 through the transmitting unit 260 (S1070).

The updating of gain is performed whenever the image pattern is received.

Figure 11:
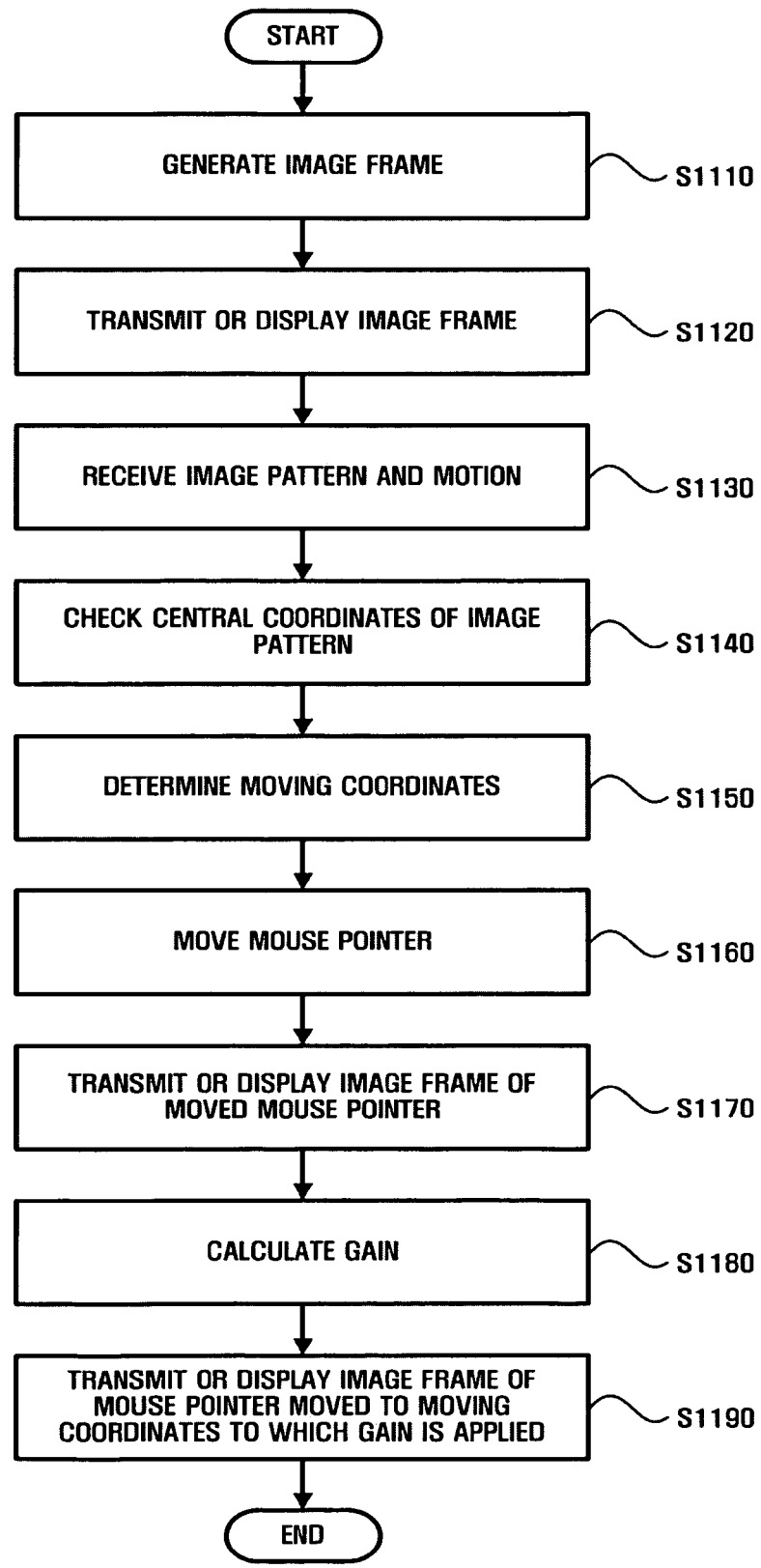
FIG. 11 is a flowchart illustrating a pointer control process according to an embodiment of the invention.

FIG. 11 is a flowchart illustrating a pointer control process according to an embodiment of the invention.

In order to control the motion of the mouse pointer 100, first, the image generating unit 320 of the pointer control apparatus 300 generates image frames (S1110). The image frames generated by the image generating unit 320 may include an image frame having image patterns arranged therein. The generated image frames are transmitted to the display apparatus 400 through the transmitting unit 370, or they are displayed by a display device (not shown) provided in the pointer control apparatus 300 (S1120).

The receiving unit 310 receives the central coordinates of the image pattern and the moving coordinates from the pointing apparatus 200.

The received central coordinates and moving coordinates are transmitted to the pointer operating unit 360, and then the pointer operating unit 360 moves the mouse pointer 100 by the displacement between the central coordinates and the moving coordinates.

Information on the movement of the mouse pointer 100 is transmitted to the image generating unit 320, and the image generating unit 320 forms the image of the mouse pointer 100 at the moved position, and the image frame generated by the image generating unit 320 is transmitted to the display apparatus 400 through the transmitting unit 370, or it is displayed by a display device (not shown).

Meanwhile, when the pointer control apparatus 300 is provided with the coordinate determining unit 330 and the gain calculating unit 350, the receiving unit 310 can receive the image pattern and the motion sensed by the inertial sensor 220 from the pointing apparatus 200 (S1130).

The received image pattern and motion are transmitted to the coordinate determining unit 330. Then, the coordinate determining unit 330 checks the central coordinates of the image pattern (S1140), and determines the moving coordinates that are moved from the central coordinates by coordinate displacement corresponding to the received motion (S1150).

The pointer operating unit 360 moves the mouse pointer 100 to the moving coordinates determined by the coordinate determining unit 330 (S1160), and an image frame is generated. The generated image frame is transmitted to the display apparatus 400 through the transmitting unit 370, or it is displayed by a display device (S1170).

The gain calculating unit 350 compares the displacement between the coordinates of two image patterns with inertial coordinates displacement corresponding to the motion sensed by the inertial sensor 220, and calculates the gain for synchronizing the inertial coordinates displacement with the displacement of the moving coordinates on the display region 450 (S1180).

The coordinate determining unit 330 determines the moving coordinates that are moved from the central coordinates of an image pattern sensed after a predetermined time by inertial coordinate displacement to which the gain is applied. The image of the mouse pointer that is moved to the moving coordinates is transmitted to the display apparatus 400 through the transmitting unit 370, or it is displayed by a display device (S1190).

As described above, the pointing apparatus, the pointer control apparatus, the pointing method, and the pointer control method according to the above-described embodiments have the following effects.

First, it is possible to provide an absolute pointing apparatus by using an image sensor to recognize image codes included in an image frame, thereby determining a pointing direction.

Second, the gain between the displacement of the motion of the pointing apparatus and the displacement of the motion of a displayed pointer is continuously updated. Therefore, it is possible to perform accurate pointing even when the distance between the pointing apparatus and the display apparatus varies.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A pointing device comprising:
   an image sensing unit to sense at least one image pattern among a plurality of image patterns arranged in a display region of a display device, to determine first position information;
   an inertial sensing unit to sense a motion of the pointing device using at least one of acceleration information and angular velocity information and to determine second position information based on the sensed motion; and
   a coordinate determining unit to determine a first set of coordinates on the display device using the first position information and the second position information,
   wherein at least one of the image patterns displayed on the display region are stored beforehand and are formed by at least one of a visible ray, an infrared ray, and an ultraviolet ray,
   wherein all of the image patterns are arranged in image frames that are displayed at predetermined time intervals, among the image frames displayed on the display region,
   wherein at least one of the image patterns displayed on the display region include one or more different image codes.

2. The pointing device of claim 1, further comprising:
a gain calculating unit to compare a coordinate displacement between coordinates of two image patterns that are sensed at a predetermined time interval with an inertial coordinate displacement corresponding to a motion that is sensed by using at least one of the acceleration and the angular velocity information for a predetermined time, and to calculate a gain for synchronizing the inertial coordinate displacement with the coordinate displacement of the first set of coordinates on the display region.

3. The pointing device of claim 2, wherein the coordinate determining unit determines the first set of coordinates after the predetermined time by the inertial coordinate displacement to which the gain is applied.

4. The pointing device of claim 1, wherein the image sensing unit comprises a camera unit to capture at least one of the image patterns displayed on the display region.

5. The pointing device of claim 1, wherein the one or more different image codes include a plurality of different image codes arranged at fixed positions on the display region.

6. The pointing device of claim 1, wherein the first set of coordinates are changed to a second set of coordinates based on the sensed motion.

7. A pointer control device comprising:
   a receiving unit to receive at least one sensed image pattern among a plurality of image patterns arranged in a display region of a display device, to extract first position information, and to receive a motion of a pointing device that is sensed by an inertial sensing unit of the pointing device to determine second position information based on the received motion; and
   a coordinate determining unit to determine a first set of coordinates on the display device using the first position information and the second position information,
   wherein at least one of the image patterns displayed on the display region are stored beforehand and are formed by at least one of a visible ray, an infrared ray, and an ultraviolet ray,
   wherein all of the image patterns are arranged in image frames that are displayed at predetermined time intervals, among the image frames displayed on the display region,
   wherein at least one of the image patterns displayed on the display region include one or more different image codes.

8. The pointer control device of claim 7, further comprising;
an image generating unit to generate an image frame that includes all of the image patterns.

9. The pointer control device of claim 7, further comprising:
a gain calculating unit to compare a coordinate displacement between coordinates of two image patterns that are sensed at a predetermined time interval with an inertial coordinate displacement corresponding to a motion that is sensed by the inertial sensing unit for a predetermined time, and to calculate a gain for synchronizing the inertial coordinate displacement with the coordinate displacement of the first set of coordinates on the display region.

10. The pointer control device of claim 9, wherein the coordinate determining unit determines the first set of coordinates after the predetermined time by the inertial coordinate displacement to which the gain is applied.

11. The pointer control device of claim 7, further comprising:
a pointer operating unit to move a mouse pointer to absolute coordinates on the display region that correspond to the first set of coordinates.

12. The pointer control device of claim 11, further comprising:

a displaying unit to display the mouse pointer at the absolute coordinates on the display region.

13. The pointer control device of claim 7, wherein the first set of coordinates are changed to a second set of coordinates based on the received motion.

14. The pointer control device of claim 7, further comprising:
an image generating unit to generate a plurality of image frames which are transmitted to the display device to be displayed by the display device; and
a transmitting unit to transmit an image of a pointer to the display device, and to transmit instructions to move the pointer based on the determined first set of coordinates,
wherein the receiving unit receives the at least one sensed image pattern from the pointing device which is disposed externally to the pointer control device.

15. A method for coordinate determining by a pointing device comprising:
sensing, by a pointing device, at least one image pattern that exists in a sensed region, among a plurality of image patterns arranged in a display region;
determining a distance from the pointing device to the at least one sensed image pattern;
adjusting a scale of the sensed region to match a scale of the image patterns arranged in the display region by changing the scale of the sensed region according to the determined distance;
extracting central coordinates of the at least one sensed image pattern using the adjusted scale of the sensed region;
sensing a motion using at least one of the acceleration and angular velocity that are generated due to the motion; and
determining next coordinates of the at least one sensed image pattern that are moved from central coordinates of the at least one sensed image pattern by coordinate displacement corresponding to the sensed motion,
wherein at least one of the image patterns displayed on the display region are stored beforehand and are formed by at least one of a visible ray, an infrared ray, and an ultraviolet ray,
wherein all of the image patterns are arranged in image frames that are displayed at predetermined time intervals, among the image frames displayed on the display region.

16. The method of claim 15, wherein at least one of the image patterns displayed on the display region are composed of one or more different image codes.

17. The method of claim 15, further comprising:
calculating the coordinate displacement between coordinates of two image patterns that are sensed at a predetermined time interval, among the at least one sensed image patterns;
comparing the coordinate displacement between the coordinates of the two image patterns with an inertial coordinate displacement corresponding to a sensed motion using at least one of the acceleration and the angular velocity for a predetermined time; and
calculating a gain for synchronizing the inertial coordinate displacement with the coordinate displacement of the next coordinates on the display region according to the result of the comparison.

18. The method of claim 17, wherein the determining of the next coordinates comprises determining the next coordinates that are moved from the central coordinates of the at least one sensed image pattern, after the predetermined time by the inertial coordinate displacement to which the gain is applied.

19. The method of claim 15, wherein the sensing image patterns comprises capturing at least one of the image patterns displayed on the display region using a camera.

20. The method of claim 15, wherein at least one of the image patterns displayed on the display region are formed by a plurality of different image codes arranged at fixed positions on the display region.

21. A method for coordinate determining by a pointer control device comprising:
receiving at least one image pattern that exists in a sensed region among a plurality of image patterns arranged in a display region and receiving a motion that is sensed by an inertial sensing unit;
extracting central coordinates of the at least one sensed image pattern based on a determined range of the at least one sensed image pattern; and
determining next coordinates that are moved from central coordinates of the at least one received image pattern by coordinate displacement corresponding to the received sensed motion,
wherein at least one of the image patterns displayed on the display region are stored beforehand and are formed by at least one of a visible ray, an infrared ray, and an ultraviolet ray,
wherein all of the image patterns are arranged in image frames that are displayed at predetermined time intervals, among the image frames displayed on the display region,
wherein at least one of the image patterns displayed on the display region include one or more different image codes.

22. The method of claim 21, further comprising;
generating an image frame that includes all of the image patterns.

23. The method of claim 21, further comprising:
calculating the coordinate displacement between coordinates of two image patterns that are sensed at a predetermined time interval among the at least one received sensed image patterns;
comparing the coordinate displacement between the coordinates of the two image patterns with an inertial coordinate displacement corresponding to a motion that is sensed by the inertial sensing unit for a predetermined time; and
calculating a gain for synchronizing the inertial coordinate displacement with the coordinate displacement of the next coordinates on the display region, according to the result of the comparison.

24. The method of claim 23, wherein the determining of the next coordinates comprises determining the next coordinates that are moved from the central coordinates of the at least one received sensed image pattern, after the predetermined time by the inertial coordinate displacement to which the gain is applied.

25. The method of claim 21, further comprising:
moving a mouse pointer to the absolute coordinates on the display region that correspond to the next coordinates.

* * * * *